United States Patent
Waldschütz

(10) Patent No.: US 12,100,854 B2
(45) Date of Patent: Sep. 24, 2024

(54) DEVICE FOR RELEASABLY CONTACTING TWO BATTERY CELLS

(71) Applicant: Raiffeisenlandesbank Oberösterreich Aktiengesellschaft, Linz (AT)

(72) Inventor: Gerhard Waldschütz, Freistadt (AT)

(73) Assignee: John Deere Electric Powertrain LLC, Moline, IL (US)

( * ) Notice: Subject to any disclaimer, the term of this patent is extended or adjusted under 35 U.S.C. 154(b) by 548 days.

(21) Appl. No.: 17/297,324

(22) PCT Filed: Oct. 29, 2019

(86) PCT No.: PCT/AT2019/060361
§ 371 (c)(1),
(2) Date: May 26, 2021

(87) PCT Pub. No.: WO2020/107043
PCT Pub. Date: Jun. 4, 2020

(65) Prior Publication Data
US 2022/0029237 A1    Jan. 27, 2022

(30) Foreign Application Priority Data
Nov. 30, 2018  (AT) .............................. A 51060/2018

(51) Int. Cl.
*H01M 50/258* (2021.01)
*H01M 50/213* (2021.01)
(Continued)

(52) U.S. Cl.
CPC ....... *H01M 50/258* (2021.01); *H01M 50/213* (2021.01); *H01M 50/244* (2021.01);
(Continued)

(58) Field of Classification Search
CPC ............. H01M 50/258; H01M 50/213; H01M 50/244; H01M 50/264; H01M 50/503;
(Continued)

(56) References Cited

U.S. PATENT DOCUMENTS

| 6,677,728 B2 | 1/2004 | Takedomi et al. |
| 10,170,741 B2 | 1/2019 | Kovent |

(Continued)

FOREIGN PATENT DOCUMENTS

| CN | 205406609 U | 7/2016 |
| CN | 206992187 U | 2/2018 |

(Continued)

OTHER PUBLICATIONS

English language espacenet Abstract for CN 206992187, Feb. 9, 2018.

(Continued)

*Primary Examiner* — Barbara L Gilliam
*Assistant Examiner* — Jordan E Berresford
(74) *Attorney, Agent, or Firm* — Tiajoloff & Kelly LLP

(57) ABSTRACT

A device is described for making independent contact with two battery cells, having a basic body comprising a through-opening (6). To enable not only an easier, modular assembly process, but also a quick replacement of individual battery cells, it is suggested that the basic body (1) comprises two receiving bodies (2,3) positioned opposite to the through-opening (6) for circumferential taking hold of one end portion each of the battery cells inserted in the receiving bodies (2,3) in a joining direction, wherein a contact spring (7) is inserted in a guide corridor (9) of the first receiving body (2) which leads into the through-opening (6) for bonded connection of the contact spring (7) with the battery cell inserted in the second receiving body (3), and that the contact spring (7) forms contact tongues (8) for releasable (Continued)

Figure 1:
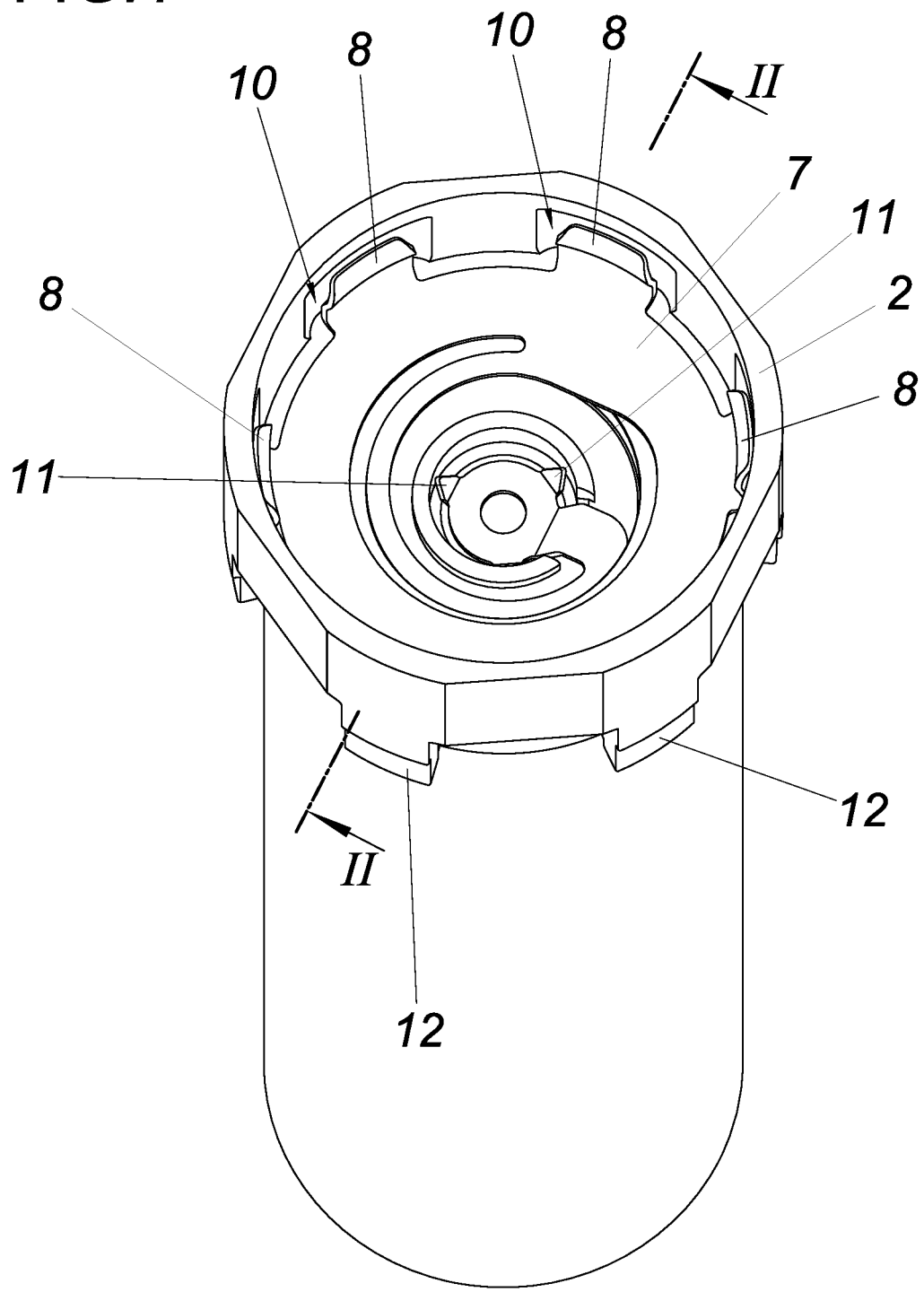

connection of the battery cell inserted in the first receiving body (2).

11 Claims, 3 Drawing Sheets

(51) Int. Cl.
- *H01M 50/244* (2021.01)
- *H01M 50/264* (2021.01)
- *H01M 50/503* (2021.01)
- *H01M 50/51* (2021.01)

(52) U.S. Cl.
CPC ....... *H01M 50/264* (2021.01); *H01M 50/503* (2021.01); *H01M 50/51* (2021.01)

(58) Field of Classification Search
CPC .. H01M 50/51; H01M 2220/20; H01M 10/02; Y02E 60/10
USPC .......................................................... 429/82
See application file for complete search history.

(56) References Cited

U.S. PATENT DOCUMENTS

| | | | |
|---|---|---|---|
| 10,957,887 B2 | 3/2021 | Kovent | |
| 2003/0193313 A1* | 10/2003 | Takedomi | H01M 10/643 |
| | | | 320/107 |
| 2008/0081252 A1* | 4/2008 | Miyazaki | H01M 50/213 |
| | | | 429/149 |
| 2009/0004558 A1* | 1/2009 | Miyazaki, II | H01M 50/579 |
| | | | 429/158 |
| 2017/0119688 A1 | 8/2017 | Kovent | |
| 2019/0097193 A1 | 3/2019 | Kovent | |

FOREIGN PATENT DOCUMENTS

| | | |
|---|---|---|
| EP | 2808852 A1 | 12/2014 |
| EP | 3096372 A1 | 11/2016 |

OTHER PUBLICATIONS

English language espacenet Abstract for CN 205406609, Jul. 27, 2016.

* cited by examiner

DEVICE FOR RELEASABLY CONTACTING TWO BATTERY CELLS

TECHNICAL FIELD

The invention relates to a device for making independent contact with two battery cells, having a basic body comprising a through-opening.

STATE OF THE ART

In order to connect individual battery cells into a battery storage module it is known (EP3096372A1) for the battery cells to be arranged at the head end in receiving areas of a contact plate and connected electrically in series with a second battery cell lined next in a joining direction of the first battery cell via contact springs. A plurality of such battery doublets connected in series is connected in parallel via an electrically conductive parallel plate, which connects the contact springs with one another. The disadvantage of this design, however, in addition to the associated assembly cost, is that to replace just one, for instance defect battery cell, the bonded connections of all battery cells must be released in order to be able to remove the defect battery cell from the group and replace it.

DESCRIPTION OF THE INVENTION

The purpose of the invention is thus to suggest a device for making contact with battery cells that can be connected to a battery storage module, which enables not only an easier, modular assembly process, but also a quick replacement of individual battery cells.

The invention solves the set task in that the basic body comprises two receiving bodies positioned opposite to the through-opening for circumferential taking hold of one end portion each of the battery cells inserted in the receiving bodies in a joining direction, wherein a contact spring is inserted in a guide corridor of the first receiving body which leads into the through-opening for bonded connection of the contact spring with the battery cell inserted in the second receiving body, and that the contact spring forms contact tongues for releasable connection of the battery cell inserted in the first receiving body. The basic body of the device in accordance with the invention comprises two receiving bodies that circumferentially take hold of the end portions of two battery cells. In order to connect two opposite poles of these battery cells electrically in a short distance, the basic body moreover comprises a through-opening for a contact spring which is releasably connected with the battery cell inserted in the receiving area of the first receiving body, and firmly bonded and thus unreleasably connected with the battery cell inserted in the receiving area of the second receiving body through the through-opening of the basic body. To facilitate a bonded connection, the contact spring is inserted in a guide corridor for positioning that runs along the floor of the first receiving body and connects to the through-opening. The releasable connection with the battery cell inserted in the first receiving body can generally be provided in different ways, however, particularly advantageous joining conditions result if the contact spring forms contact tongues which resiliently fit to the inserted battery cell. Particularly secure seating of the battery cell in the receiving area of the first receiving body results if the contact tongues rise against the joining direction and circumferentially take hold of the inserted battery cell under pre-load. Accordingly, a particularly advantageous joining process results according to the features in accordance with the invention, because one of the battery cells to be contacted electrically can be inserted initially in the receiving area of the second receiving body, whereupon the contact spring is inserted in the guide corridor of the first receiving body positioned opposite the through-opening. Then the end portion of the contact spring protruding into the through-opening is firmly bonded with a cell pole of the inserted battery cell. The first battery cell prepared in such a way can then simply be connected with another battery cell by inserting the same in the receiving area of the first receiving body, wherein the contact tongues enable an electric contact to be made with the other battery cell.

In order to decouple the battery cells better from one another mechanically, both laterally to as well as in the joining direction, it is suggested that the guide corridor runs spirally around the through-opening and takes up the contact spring with a clearance lateral to the joining direction. This means that the contact spring is also designed spirally and an expansion of the same in the joining direction is thus facilitated. In addition, this results in a fusible cut-out if the spring cross-section is suitably dimensioned.

To prevent impairment of adjacent cells in the case of a fault, the guide corridor can be covered towards the receiving area of the first receiving body by a fire protection. On the one hand, it is thus prevented that a heat development in the contact spring, in particular when designed as a fusible cut-out, is transferred to the battery cell inserted in the first receiving body. On the other hand, if the battery cell inserted in the second receiving body is damaged, it is possible to prevent a chain reaction that escaping hot gas or even escaping flames reach through the through-opening into the receiving area of the first receiving body if the fire protection covers not only the guide corridor, but also the through-opening.

In order to prevent mechanical over-determination of the contact spring despite space-saving form-fit reception of the battery cell in the receiving area of the first receiving body, and not to lead all necessary clamping forces into the contact spring at the same time, it is suggested that the contact tongues of the contact spring protrude from the guide corridor against the joining direction into circumferential recesses of the first receiving body adjoining the receiving area. Hence, it is possible to make direct contact between the shell of the battery cell and most of the inside of the shell surface of the first receiving body, as a result of which sufficiently high stability of the plug mechanism is achieved while, on the one hand, the shell of the battery cell is encompassed by the contact tongues with a sufficiently high pre-load and, on the other hand, a permanent form-fit connection between the first receiving body and the battery cell is facilitated. Nonetheless, the contact tongues remain movable with a clearance relative to the basic body or the first receiving body as a result of this design.

To prevent damage to the bonded connection between the contact spring and the battery cell received by the second receiving body, it is recommended in a particularly advantageous embodiment of the device in accordance with the invention that the second receiving body forms latching bodies protruding into its receiving area for engagement into a groove of the battery cell inserted in the receiving area of the receiving body. This way, the freedom of movement of the battery cell firmly bonded with the contact spring is restricted in the joining direction, as a result of which breaking of the contact spring or the bonded connection is prevented.

In order to be able to discharge any gas volumes developing in the case of a gas emission of the battery cell inserted in the receiving area of the second receiving body safely and still be able to achieve a compact design of the device in accordance with the invention, it is suggested that the basic body comprises a degassing duct between the second receiving body, the guide corridor and the through-opening, which connects the receiving area of the second receiving body with at least one degassing opening on the shell of the basic body. This means that at least the degassing openings in the joining direction are arranged at the level of the guide corridor or at the level of the through-opening. To prevent isolated pressure peaks and reduce the speeds of outflow at the same time, the cross-section of the degassing duct can be extended from a single one to a plurality of degassing openings.

To prevent a flow of gas towards the first receiving body, the basic body can form a guide surface for leading hot gas escaping from the battery cell inserted in the receiving area of the second receiving body into the degassing duct. For this purpose, the guide surface is designed in such a way that hot gas escaping from the degassing valve of the battery cell inserted in the receiving area of the second receiving body is discharged by the though-opening of the basic body and led into the degassing duct. To improve the flow conditions, the receiving area of the second receiving body can be limited by a fire protection while forming a flow opening opposite the degassing duct, whereby this can be made from mica, for instance, or from alternative materials obvious to those skilled in the art.

To facilitate the insertion of a battery cell in the receiving area of the second receiving body, it is suggested that the second receiving body forms latching arms protruding from the basic body, circumferentially taking hold of the receiving area. At the same time, the free space resulting between the latching arms can form degassing openings for the degassing duct.

For exact positioning of the contact spring portion to be connected before the permanent connection is completed, it is advantageous if the contact spring forms clamping fins at its end portion leading into the through-opening. As a result of the fact that the contact spring is consequently only positioned within the through-opening under a pre-load, however, it still remains displaceable with a clearance, so that a mechanical load of the electrical contact spring is prevented despite the positioning aid.

In order to facilitate the assembly process in a module from a plurality of battery cells, on the one hand, and to enable the replacement of individual battery cells regardless of their position in the module, on the other hand, a module can be provided with a plurality of devices in accordance with the invention comprising a carrier with a plurality of recesses for circumferential, releasable taking hold of the second receiving bodies. The carrier thus arranged can prevent the release of the groove-latching body connection between the second receiving body and the battery cell, if the recesses form limit stops for the second receiving body laterally to the joining direction. In the easiest case, the recesses take hold of the second receiving bodies in a form-fitting manner at the same time. For assembly, a battery cell can be inserted initially in the second receiving body in the devices in accordance with the invention as described above, whereupon the bonded connection between the contact spring and said first battery cell is produced. Then the devices with the first battery cells can be inserted in the recesses of the carrier, whereupon further battery cells are inserted in the first receiving bodies protruding beyond the carrier. If a battery cell of the module is defective, the device concerned can be released from the carrier plate independently from the other devices and a relevant replacement be made. For equal height alignment of the different devices in accordance with the invention on the carrier, the respective second receiving bodies can form stop surfaces acting in the joining direction.

To enable potential equalisation despite the modular design, it is suggested that the battery cells inserted in the first receiving bodies are connected via their cell shell through a contact unit making electrical contact. Said contact unit can be spaced from the carrier and form a flow duct jointly with the same, into which the individual degassing openings of the devices in accordance with the invention lead.

SHORT DESCRIPTION OF THE INVENTION

Figure 2:
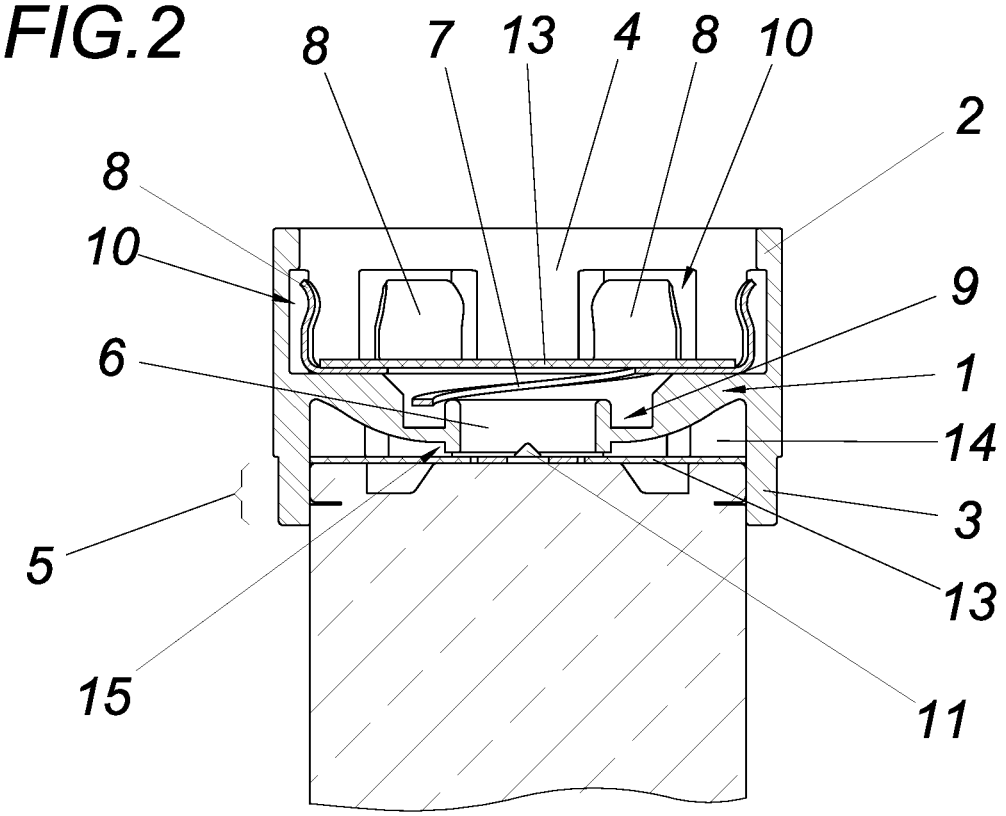
Figure 2:
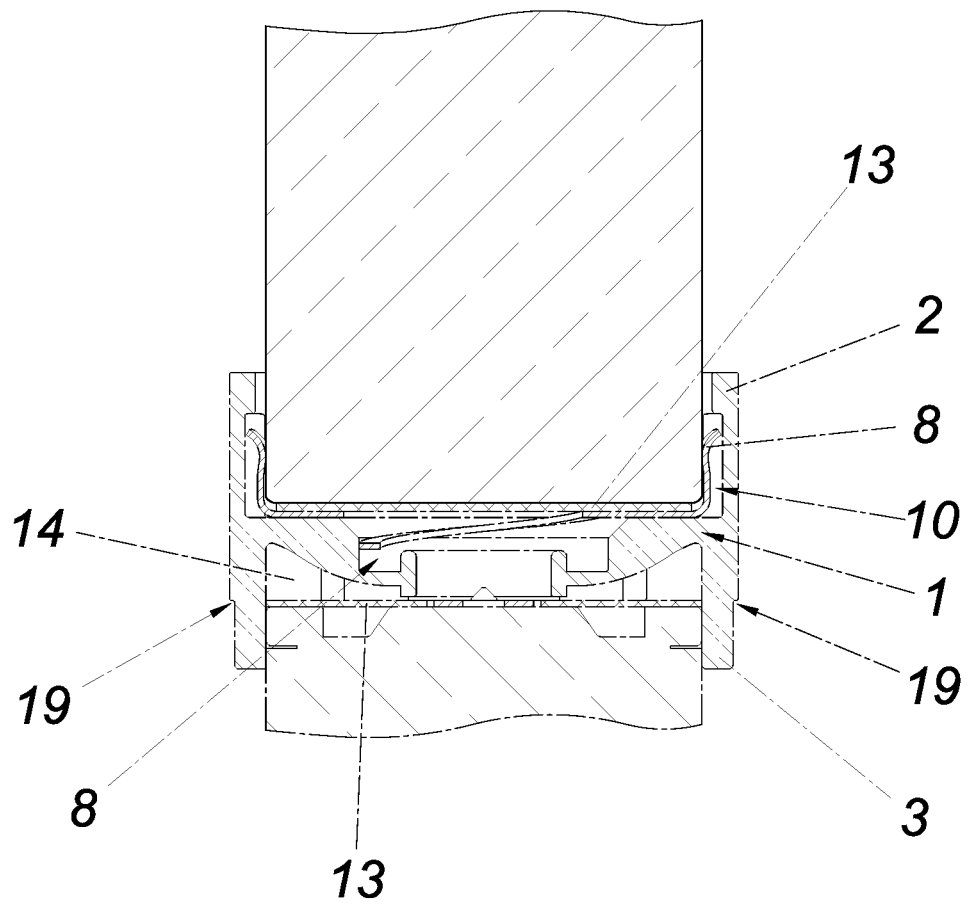
Figure 3:
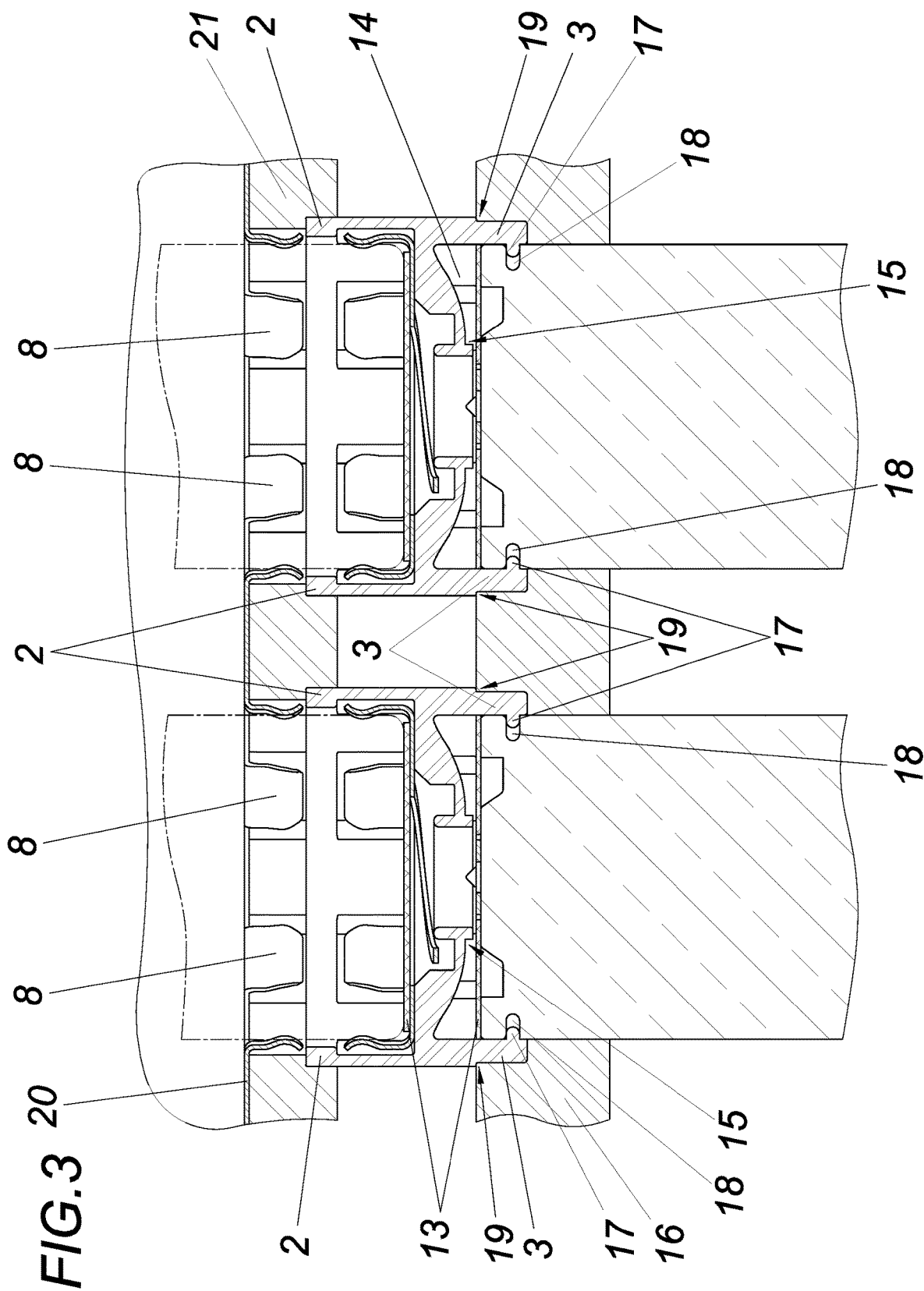

The subject-matter of the invention is shown in the drawing by way of example. The drawings show:

FIG. 1 the device in accordance with the invention with a battery cell received in the receiving area of the second receiving body, FIG. 2 a section according to line II-II of FIG. 1 through two battery cells connected in series via the device in accordance with the invention, and FIG. 3 a section of a module made up of devices in accordance with the invention.

METHODS FOR IMPLEMENTATION OF THE INVENTION

The device in accordance with the invention for making independent contact between two battery cells comprises a basic body 1 having a first receiving body 2 and a second receiving body 3, which circumferentially take hold of the end portions of the respective battery cells. Contact with the battery cells inserted in the receiving areas 4,5 of the receiving bodies 2,3 is made via a contact spring 7 led through a through-opening 6. For this purpose, the contact spring 7 comprises contact tongues 8 which rise against the joining direction and take clamping hold of a battery cell assigned to the first receiving body 2, and passes through the through-opening 6 of the basic body 1, as a result of which a bonded connection of the contact spring 7 with a battery cell inserted in the receiving area 5 of the receiving body 3 is enabled, for instance by welding or soldering processes. To facilitate the bonded contacting, the contact spring 7 is arranged in a guide corridor 9 running along the floor of the first receiving body 2.

Through the device in accordance with the invention, particularly advantageous assembly conditions result. Thus, in a first assembly step, the contact spring 7 is inserted in the guide corridor 9, whereupon a first battery cell is inserted in the receiving area 5 of the second receiving body 3. Based on the free accessibility of the receiving area 4 of the first receiving body 2 for the moment, the bonded contact of this battery cell with the contact spring 7 can be made in a simple manner. In the last step, another battery cell is inserted in the receiving area 4 of the first receiving body 2, wherein the contact is made releasable via the clamping contact tongues 8. So that the whole necessary clamping force does not have to be applied only by the contact tongues 8, these can protrude from recesses 10 being incorporated in the first receiving body 2 and adjoining its receiving area 4. This way, the battery cell taken clamping hold of by the contact tongues 8 of the contact spring 7 is additionally fixed by a form-fit connection between the first receiving body 2 and the battery cell.

As can be concluded from FIG. 1, both the guide corridor 9 as well as the contact spring 7 arranged inside can be designed spirally, as a result of which a mechanical decoupling in the joining direction is achieved. If the mechanical decoupling is supposed to be enabled not only in but also laterally to the joining direction, the guide corridor 9 can be dimensioned such that the contact spring 7 arranged inside is displaceable with a clearance lateral to the joining direction, as can be concluded from FIG. 2. So that the bonded connection between the contact spring 7 and the battery cell received by the second receiving body 3 can be made accurately despite this clearance, the contact spring 7 forms clamping fins 11 at its end portion protruding into the through-opening 6. The battery cell can be inserted in this second receiving body 3 particularly easily and energy-sparingly, if the same forms latching arms 12 that circumferentially take hold of the battery cell.

FIG. 2 shows two battery cells connected in series via the device in accordance with the invention. In order to be able to prevent reciprocal impairment of the adjoining battery cells, the devices shown in FIG. 2 comprise a fire protection 13, which covers the guide corridor 9 and in this embodiment also the through-opening 6. Another fire protection 13 can be arranged between the battery cell received in the receiving area 5 of the second receiving body 3 and the degassing duct 14 after that, wherein said fire protection 13, which is made of mica, for instance, or other fireproof materials obvious to those skilled in the art, must be provided with an opening for bonded connection of the battery cell with the contact spring 7. The cross-section of the degassing duct 14 arranged between the receiving area 5, the guide corridor 9 and the through-opening 6 expands to the degassing opening arranged on the shell of the second receiving body 3 in the direction of the basic body 1, so that isolated pressure peaks can be prevented despite a compact design of the device in accordance with the invention. The degassing duct 14 can adjoin a guide surface 15 formed by the basic body 1, as shown in FIGS. 2 and 3, for instance, as a result of which targeted diversion of a hot gas escaping from the battery cell into the degassing duct 14 is facilitated.

A section of a module made up of a plurality of devices in accordance with the invention is shown in FIG. 3. A carrier plate inserted as carrier 16 comprises a plurality of recesses for this purpose, which take hold of the second receiving body 3 of the devices, as a result of which an unintentional release of the latching bodies 17 of the second receiving bodies 3 from grooves 18 incorporated into the battery cells is prevented. For equal height alignment, the respective second receiving bodies 3 can form stop surfaces 19 acting in the joining direction. In an alternative embodiment of the carrier plate 16 shown in FIG. 3, its recesses can take hold of both the receiving bodies 3 as well as the battery cells arranged therein. The battery cells inserted in the first receiving bodies 2 can be connected with one another via their cell shells through a contact unit 20, which can be arranged on a parallel plate 21 acting as support. For making a proper releasable contact, it is recommended that the contact unit 20 comprises recesses that circumferentially take hold of the battery cells. To ensure a particularly secure seat, the contact unit 20 can form contact tongues 8, as shown in FIG. 3, which resiliently take hold of the battery cells arranged in the recesses.

Through the device in accordance with the invention, the replacement of individual battery cells is enabled independently from their position in the module. In the case of any damage of a battery cell, the contact unit 20 is separated from the cell shells of the battery cells assembled to a module. After pulling out the releasably connected battery cell from the receiving area 4 of the receiving body 2, the device in accordance with the invention with the still remaining defective and firmly bonded battery cell becomes freely accessible. Then the device can be separated from the carrier plate 16 by pulling it out, as a result of which a replacement of the defective battery cell is enabled. The position of the devices in accordance with the invention of the intact battery cells remains unchanged. Assembly of the device in accordance with the invention with a module is performed in the opposite order.

The invention claimed is:

1. A device for making independent contact with two battery cells, comprising:
    a basic body having a through-opening;
    wherein said basic body comprises first and second receiving bodies positioned opposite to each other relative to said through-opening and each being configured to take circumferential hold of an end portion of a respective battery cell inserted therein in a joining direction;
    wherein the first receiving body has a recess therein facing toward the battery cell in said first receiving body;
    said recess being spaced outward and apart from the through opening and providing a guide corridor in which a contact spring is inserted, wherein said guide corridor leads into the through-opening and receives therein a first portion of the contact spring that electrically connects with a second portion of the contact spring in the through opening that is secured in electrical connection with the battery cell inserted in the second receiving body, and
    wherein said contact spring has contact tongues that are connected with the portion of the contact spring in the guide corridor and that provide releasable electrical connection of the battery cell inserted in said first receiving body and electrical connection through the contact spring to the battery cell in the second receiving body.

2. The device in accordance with claim 1, wherein the guide corridor runs spirally around the through-opening and receives the contact spring with a clearance lateral to the joining direction.

3. The device in accordance with claim 1, wherein the guide corridor is covered towards a receiving area of the first receiving body by a fire protection.

4. The device in accordance with claim 1, wherein the contact tongues of the contact spring extend away from the guide corridor in a direction opposite to the joining direction into circumferential recesses of the first receiving body, said circumferential recesses adjoining a receiving area of the first receiving body.

5. The device in accordance with claim 1, wherein the second receiving body has latching bodies protruding into a receiving area of the second receiving body and providing engagement into a groove of the battery cell inserted in the receiving area of the second receiving body.

6. The device in accordance with claim 1, wherein the basic body has a degassing duct between the second receiving body, the guide corridor and the through-opening, wherein said degassing duct connects a receiving area of the second receiving body with at least one degassing opening on a shell of the basic body.

7. The device in accordance with claim 6, wherein the basic body has a guide surface configured to lead gas escaping from the battery cell inserted in the receiving area of the second receiving body into the degassing duct.

8. The device in accordance with claim 1, wherein the second receiving body has latching arms protruding from the basic body, and configured to circumferentially take hold of a receiving area of the second receiving body.

9. The device in accordance with claim 1, wherein the contact spring has clamping fins at an end portion thereof leading into the through-opening.

10. A module comprising a plurality of devices in accordance with claim 1 and a carrier having a plurality of recesses circumferentially and releasably taking hold of the second receiving bodies of said devices.

11. The module in accordance with claim 10, wherein a contact unit creates electrical interconnection of the battery cells via cell shells thereof, said battery cells being inserted in the first receiving bodies of said devices.

* * * * *